United States Patent [19]

Burns et al.

[11] Patent Number: 5,454,106
[45] Date of Patent: Sep. 26, 1995

[54] DATABASE RETRIEVAL SYSTEM USING NATURAL LANGUAGE FOR PRESENTING UNDERSTOOD COMPONENTS OF AN AMBIGUOUS QUERY ON A USER INTERFACE

[75] Inventors: Luanne M. Burns, Ridgefield, Conn.; Ashok Malhotra, Croton-On-Hudson, N.Y.

[73] Assignee: International Business Machines Corporation, Armonk, N.Y.

[21] Appl. No.: 62,502

[22] Filed: May 17, 1993

[51] Int. Cl.[6] .................................................. G06F 17/30
[52] U.S. Cl. ................ 395/600; 364/419.08; 364/963.1; 364/974.6; 364/DIG. 2
[58] Field of Search ..................................... 395/600, 419; 364/419

[56] References Cited

U.S. PATENT DOCUMENTS

| | | | |
|---|---|---|---|
| 3,932,948 | 1/1976 | Goddard et al. | 434/314 |
| 4,241,402 | 12/1980 | Mayper, Jr. et al. | 395/575 |
| 4,506,326 | 3/1985 | Shaw et al. | 395/700 |
| 4,553,222 | 11/1985 | Kurland et al. | 364/401 |
| 4,570,217 | 2/1986 | Allen et al. | 364/188 |
| 4,670,848 | 6/1987 | Schramm | 395/60 |
| 4,674,042 | 6/1987 | Hernandez et al. | 364/401 |
| 4,688,195 | 8/1987 | Thompson et al. | 395/12 |
| 4,688,198 | 8/1987 | Wiggins | 367/46 |
| 4,723,211 | 2/1988 | Barker et al. | 395/147 |
| 4,736,296 | 4/1988 | Katayama et al. | 364/419.08 |
| 4,747,059 | 5/1988 | Hirayama et al. | 364/496 |
| 4,803,641 | 2/1989 | Hardy et al. | 395/76 |
| 4,815,029 | 3/1989 | Barker et al. | 395/146 |
| 4,816,994 | 3/1989 | Freiling et al. | 395/75 |
| 4,829,423 | 5/1989 | Tennant et al. | 364/419.08 |
| 4,829,427 | 5/1989 | Green | 364/300 |
| 4,831,580 | 5/1989 | Yamada | 395/133 |
| 4,849,898 | 7/1989 | Adi | 364/419.1 |
| 4,866,634 | 9/1989 | Reboh et al. | 395/76 |
| 4,891,766 | 1/1990 | Derr et al. | 395/76 |
| 4,914,590 | 4/1990 | Loatman et al. | 364/419.08 |
| 4,931,950 | 6/1990 | Isle et al. | 395/11 |
| 4,942,526 | 7/1990 | Okajima et al. | 364/419.08 |
| 4,943,932 | 7/1990 | Lark et al. | 395/76 |
| 4,974,191 | 11/1990 | Amirghodsi et al. | 395/275 |
| 4,980,917 | 12/1990 | Hutchins | 395/2.63 |
| 4,994,967 | 2/1991 | Asakawa | 364/419 |
| 5,029,085 | 7/1991 | Ito | 364/419.08 |
| 5,065,347 | 11/1991 | Pajak et al. | 395/159 |
| 5,088,052 | 2/1992 | Spielmal et al. | 395/158 |
| 5,175,814 | 12/1992 | Anick et al. | 395/161 |
| 5,301,317 | 4/1994 | Lohman et al. | 395/600 |
| 5,369,575 | 11/1994 | Lamberti et al. | 364/419.08 |
| 5,377,103 | 12/1994 | Lamberti et al. | 364/419.08 |

OTHER PUBLICATIONS

M. D. Williams, "What Makes Rabbit Run?", 1984, Academic Press Inc. (London) limited. pp. 333–352.

K. Y. Whang, A Malhotra, G. Sockut, L. Burns & K. Choi, "Two–Dimensional Specification of Universal Quantification in a Graphical Database Query Language" IEEE Transactions on Software Engineering, vol. 18, No. 3, Mar. 1992 pp. 216–224.

L. M. Burns, A Malhotra, G. Sockut, K. Whang "Aerial Ad Hoc Entity–Relationship Investigation and Learning", IEEE Transactions on Software Eng. (USA vol. 18, No. 3 Mar. 1992 pp. 1151–1159.

*Primary Examiner*—Thomas G. Black
*Assistant Examiner*—Peter Y. Wang
*Attorney, Agent, or Firm*—Louis J. Percello

[57] ABSTRACT

Information is retrieved from a database using natural language (NL) queries and graphical interfaces and displays. A query is separated into tokens which are parsed into elements. The parsed elements are matched to a list of database names. If all the parsed elements can be uniquely matched to database names, a database query is constructed and used to query the database to retrieve information and to present to a user. However, when an ambiguous query is encountered, i.e. all of whose elements cannot be uniquely matched with database names, the understood components of the ambiguous query, i.e., those elements matching database names, are presented the user along with relationships of the elements to other names in the database so that the user can use an interface to explore the database by accessing and displaying this database information and these relationships.

The interface can take the form of views on a graphical interface. Using the displayed information, the user can create associations between database names and components not understood in the query. In other words, database names can be associated with the natural language words or phrases. These associations are added to the system knowledge and used to respond to future queries. In this way, the system learns, i.e., by using the added associations the system is able to respond to queries that it was unable to respond in a satisfactory manner before the association was added.

14 Claims, 7 Drawing Sheets

DATABASE RETRIEVAL SYSTEM USING NATURAL LANGUAGE FOR PRESENTING UNDERSTOOD COMPONENTS OF AN AMBIGUOUS QUERY ON A USER INTERFACE

FIELD OF THE INVENTION

This invention relates to the field of gaining access to computer database information by using a novel combination of natural language and graphical queries and displays.

BACKGROUND OF THE INVENTION

The prior art includes many computer systems that allow the user to obtain information from databases by entering a natural language query or command. Examples include Intellect[1], Natural Language from NLI[2], and Language Access from IBM[3]. ("Language Access" is a trademark of the IBM Corporation.) These prior art systems generally follow the same method. First a natural language query is posed to the system using some sort of interface like a computer keyboard and screen. The system runs the input through a scanner or tokenizer that breaks the natural language (NL) query into individual words or tokens and looks up each word/token in a system dictionary. The system then uses a NL parser that parses the query into its elements. The output of the parser is organized as a parse tree that shows the relationship between the elements. The parser may also provide additional information about each parse tree element, called element attributes, that might include: the parse tree element part of speech, its tense, and/or any parse tree element synonyms, hyponyms, and hypernyms. A matching step is then performed where one or more parse tree elements and/or attributes are matched to names in the database. For a relational database, the names would include table and table field names. If the NL query can be completely and unambiguously parsed and if the relevant elements can be matched to the database names and, further, if the NL query can be transformed into a complete and correct database query then the desired information is retrieved from the database and displayed in some format on the user interface (e.g., computer screen). However, if the query cannot be unambiguously parsed or if there is a partial or multiple match between the parse tree element(s) and the database names, or a correct database query cannot be constructed, then the system is unable to "understand" the user request. Incorrect database information or no information at all will be retrieved in these cases.

There are many ways in which the system can fail to "understand" the user request. First, the scanner/tokenizer may not recognize one or more words/tokens of the NL query if, for example, one or more of the words/tokens (or their synonyms) making up the NL query do not match the entries in the system dictionary. Second, the parser may fail to correctly parse the natural language input. This can occur if the natural language input has a structure which the parser does not recognize. Alternatively, the parser can fail by yielding multiple parses. This can occur even for relatively simple NL queries.

The prior art tries to resolve these problems in a number of ways. Often the prior art asks for clarification. Clarification is helpful if the natural language query can be resolved by using a different word or by defining the misunderstood word. If the system does not understand the syntactic structure of the query, the system may ask the user to clarify the query by rephrasing the NL query in an understandable form. However, in case of multiple parses, the system must then decide to which of the possible parses it should respond. Several heuristics are used to determine this. For example, the parse that best matches the names in the database may be selected. However, these heuristics are often no better than guesswork.

Failures can occur in the prior art even after a single correct parse. In these cases, some or all of the elements in the parse tree cannot be matched to the names in the database. In these instances, the process fails and a database query cannot be developed to retrieve the desired information from the database. The system can still ask for clarification or rephrasing but it is very difficult in this case to tell the user how to change the query. Repeated, non-specific requests to rephrase the query can quickly discourage the user and cause the system to be rejected. To avoid this, some prior art guesses at the meaning of the natural language query. Guessing sometime permits information retrieval from the database, but the user has no way of telling if the information retrieved and presented is the correct system response or not. Guessing and presenting the wrong information can rapidly cause the user to lose faith in the system and stop using it.

STATEMENT OF PROBLEMS WITH THE PRIOR ART

Understanding natural language using computer recognition systems is very difficult and is still the subject of a great deal of ongoing research. The prior art fails to understand a large fraction of natural language queries and fails to accurately translate them into database queries. As discussed above, this can occur due to a variety of causes: not recognizing individual words/tokens or phrases, not recognizing the syntactic form employed, and not developing a proper parse. Further, at times the prior art fails to query the database information even though the input query can be parsed unambiguously because it cannot match all the elements in the parse tree unambiguously to database names or is unable to develop a correct database query from the matched elements. In all of these situations, no information is retrieved that responds to the input query or, worse yet, the retrieved information is erroneous.

The prior art does not improve with usage. There is no capability to "teach" the prior art new concepts. The prior art systems do not improve with use over time because they cannot "learn" to retrieve database information using new and different input words and NL phrases.

Finally, and most importantly, the prior art cannot explain itself to the user. In case of partial understanding, it is unable tell the user what it has understood. Neither can it explain what concepts are included in the database that can be queried. Therefore, prior art systems lack the ability to teach the user to use system more effectively.

OBJECTS OF THE INVENTION

An object of this invention is an improved, user-friendly apparatus and method that enables a user to respond to ambiguous queries.

Another object of this invention is an improved database query system using a combination of natural language and graphical displays and operations.

Another object of this invention is an improved combined natural language and graphical data retrieval system and method that resolves ambiguous input queries by displaying a subset of the database organization according to what is understood of the query and by allowing the user to further explore the database using the graphical capabilities.

A further object of this invention is an improved data retrieval system and method that learns in the process of resolving ambiguous NL queries so that those queries can subsequently be understood.

SUMMARY OF THE INVENTION

The present invention is a novel method and apparatus for retrieving information from a database using natural language (NL) queries and graphical interfaces and displays. The system is able to resolve ambiguities that result from the NL query by presenting the user with information in the database that matches words/tokens or parsed elements of the query. Specifically, the system presents the user what it "understands" of the query in the preferred form of a graphical display. Using the graphical display and what the system understands as a starting point, the user explores the database by accessing and displaying database information and information relationships. The user is also able to specify queries directly by using graphical operations on the information presented. Finally, the user can specify a database "view" by using graphical operations on the display and establishing an association between the view and a NL word or phrase. This association is stored in the system and used to match elements in the parse tree for future queries. In this way, the system learns and improves with use and over time. As associations are added to it, the system can respond to an ever increasing set of NL queries.

DETAILED DESCRIPTION OF THE INVENTION

Figure 1:
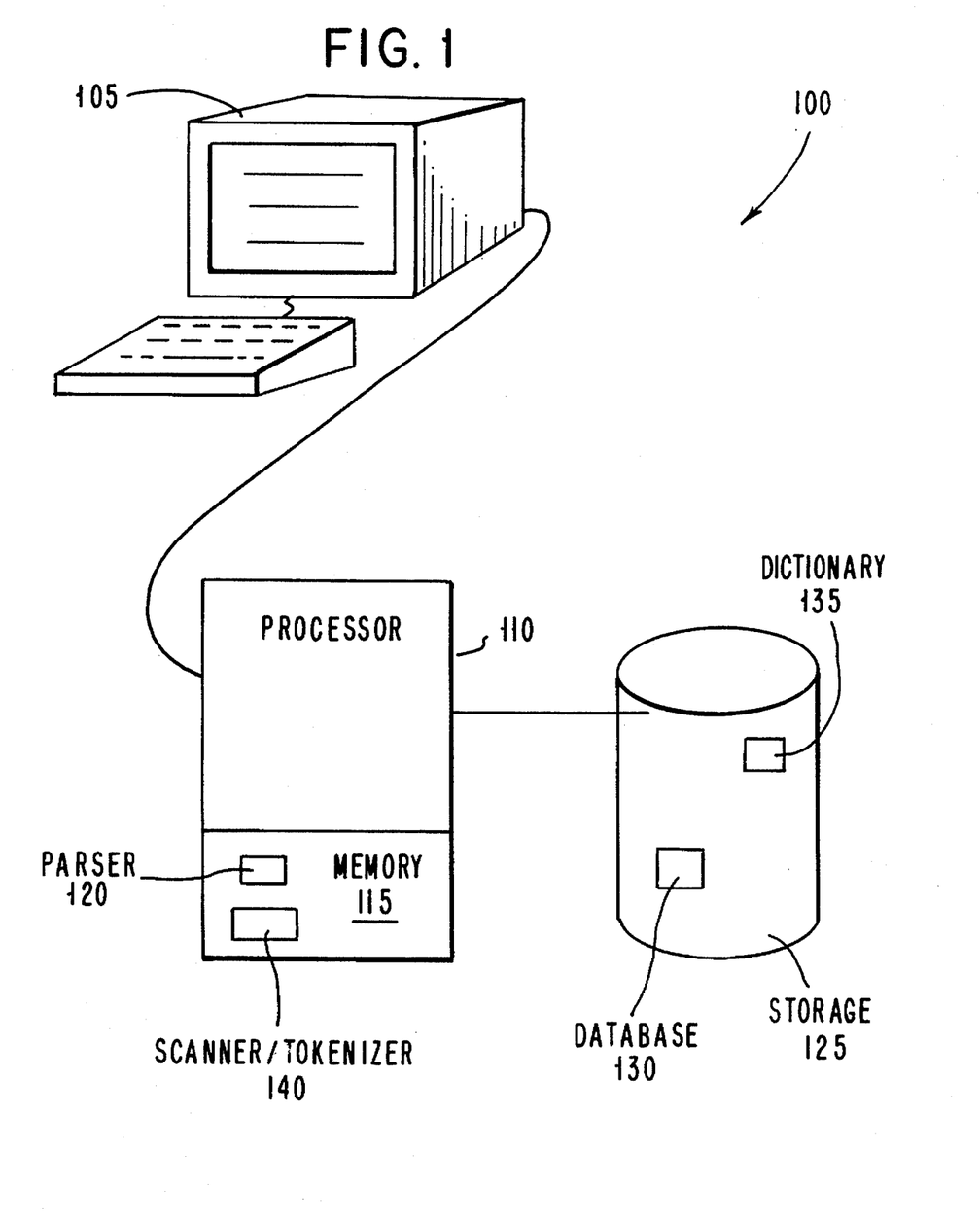
FIG. 1 is a block diagram showing the hardware components of a preferred natural language data retrieval system.

FIG. 1 shows a preferred computer system apparatus 100 of the present invention comprising a user interface 105, a processor 110, and a storage memory 125. The user interface 105 can be a standard keyboard/CRT display, a speech recognition interface, and/or an interface to another system, such as another computer, that requests information from the database 130 resident on the storage memory 125. A dictionary 135 is also resident on the storage memory 125 or alternatively in main memory 115. User interfaces 105 like these, along with other equivalent interfaces, are well known. The processor 110 can be a standard personal computer, mainframe computer or other computer system that is also well know. The processor 110 has some main memory 115, a parser program 120, and a scanner/tokenizer program 140. The storage memory 125 can be a disc drive or other equivalent bulk storage apparatus. Alternatively, the database 130 and/or dictionary 135 can be stored in the main memory 115 and the storage memory 125 can be omitted. One preferred system for embodying this invention is an IBM PS/2 Model 95 computer equipped a microchannel speech accelerator card #6306, a graphical CRT display, 16 megabytes of random access memory, and 300 megabytes of storage memory. One preferred parser 120 is the parser in the IBM Language Access product [3], and one preferred scanner/tokenizer 140 is the scanner/tokenizer in [3]. Equivalent parsers 120 and scanner/tokenizers 140 may also be used.

Figure 2:
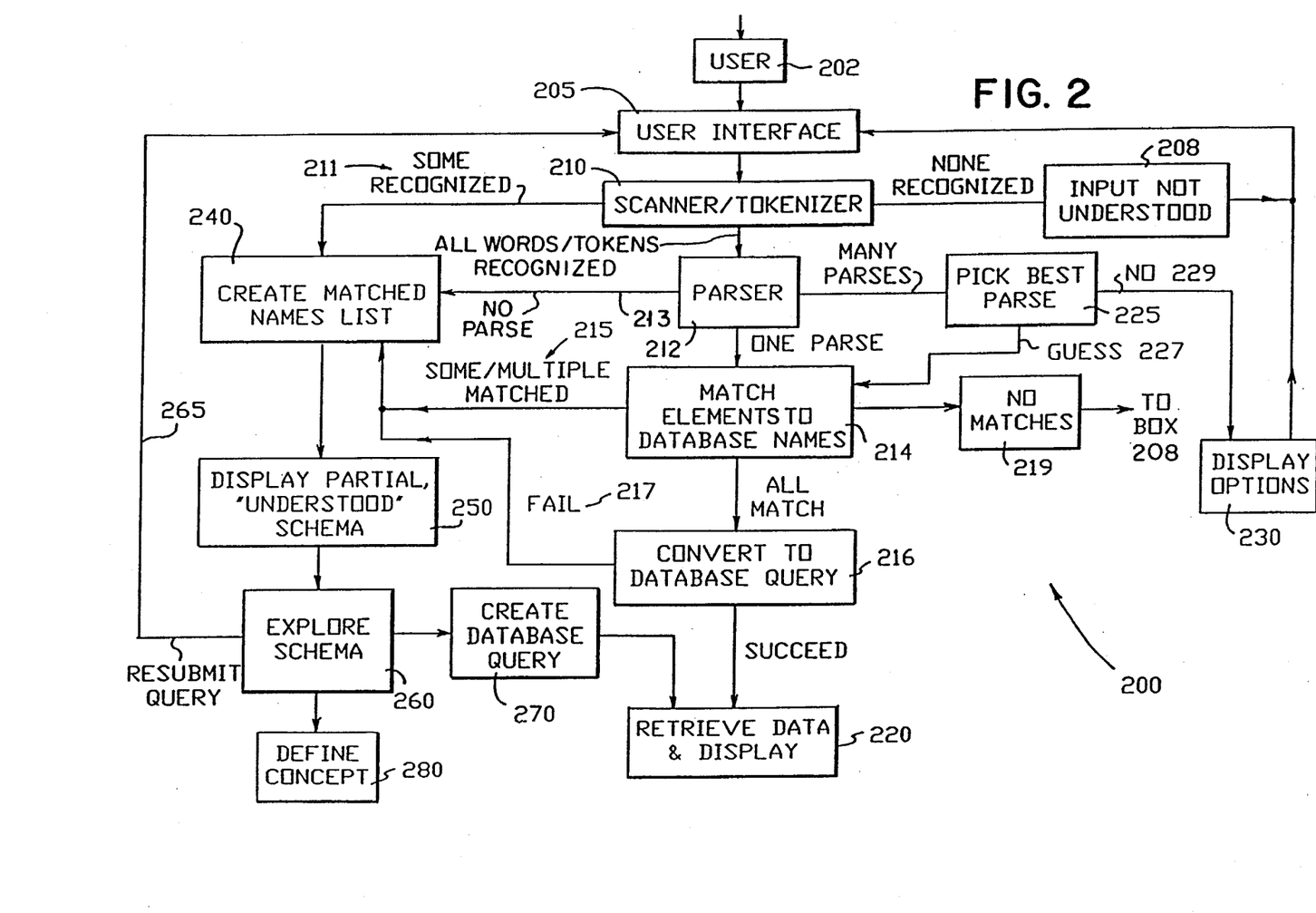
FIG. 2 is a flow chart showing the steps of the process of resolving ambiguous queries and retrieving matched information from the natural language data retrieval system.

FIG. 2 shows a flow chart of the method 200 used by the present apparatus shown in FIG. 1.

A user 202 (a human or an apparatus capable of querying a system database) interacts with the system interface 205. The interface 205, embodied in FIG. 1 as component 105, receives an input query, preferably a natural language (NL) query, from the user. The NL query can be in the form of text input to a keyboard interface 205 or auditory speech to a speech recognition interface 205. The user interface 205 ultimately converts the user input query into a system recognizable format so that it can be scanned by the scanner/tokenizer 210.

Block 210 shows the scanner/tokenizer. A scanner/tokenizer takes the input (NL) query and breaks it up into identifiable word or token components. (A token is a symbol, like a NL word, that can be recognized by matching it to entries in a system dictionary 135.) For typed input, the word/tokens are identified by being delimited by blanks. For speech input, the word/token may be delimited by pauses. Other ways of identifying speech tokens e.g., matching of words or partial words, are well known in the art.

In one embodiment, if one or more words/tokens of the NL query are scanned and not understood (e.g., the words/tokens fail to match data in the scanner/tokenizer 210 dictionary), feedback is given to the user 202 through the user interface 205 by block 208. Block 208 typically would indicate that the NL query is not understood by the system 100 and would request an alternate NL query. The user 202 would continue to input alternative NL queries until all the words/tokens are understood by the scanner/tokenizer 210. At this point, the scanner/tokenizer 210 would convert the words/tokens of the NL query into a form recognized by the parser 212.

The case where some of the words/tokens of the NL query are never recognized by the scanner/tokenizer 210, for our purposes, is called a scanner or tokenizer ambiguity 211. Resolution of the tokenizer ambiguity 211 is described below.

The parser 212 can be any known parser that is capable of parsing the user input into elements. As stated above, the parsed query elements can have information about the relationships of the components with in the NL query and possibly additional attribute information about the NL query components.

The parser 212 results can take three forms: many parses of the NL query, one parse of the NL query, and no parses of the NL query. For example, many parses can occur where one or more word/token in the NL query has more than one meaning or can be used as more than one part of speech in the NL query. Other examples are also known. The one parse case occurs when there is only one meaning and one organization of the NL query components that the parser 212 is able to provide. The no parse case 213 might occur if the query contains a NL construction that the parser does not recognize or if there is a typographical error in NL query which yields recognizable words/tokens that do not make sense in a sentence. For example, misspelling "show" as "how".

If there are many parse results, an algorithm is used in box 225 to select the best or most likely parse of the NL query. This can be done in two ways (227 and 229). First 229, the system can display the misunderstood candidate parse results (box 230) to the user 202 through the user interface 205 with a request to the user 202 to select the correct parse. Alternatively, the system can select one of candidate parse results using a heuristic 227. There are many known heuristics 227 for doing this (for example using statistical analysis to select the most probable parse), but often the heuristics boil down to the system guessing which candidate parse result represents the user's intention. The elements of a single successful parse or a selected candidate parse (if there is more than one parser result) are matched to names in the database in box 214.

The last parser result form, the no parse result, is called a parser failure 213 for our purposes. The case of the parser failure 213 will be discussed below.

The database 130 of the system 100 is stored in the system memory (typically in bulk storage 125) and can have the structure of databases generally known in the art. See FIG. 3. The preferred database comprises records having fields (or attributes) that contain values. Collections or records are called files or tables. The "names" in the database are the names of the tables (these names are the same as the names of the records in the table) and the names of the fields of the table. They also include meaningful join names and database view names. These are explained below.

Figure 3:
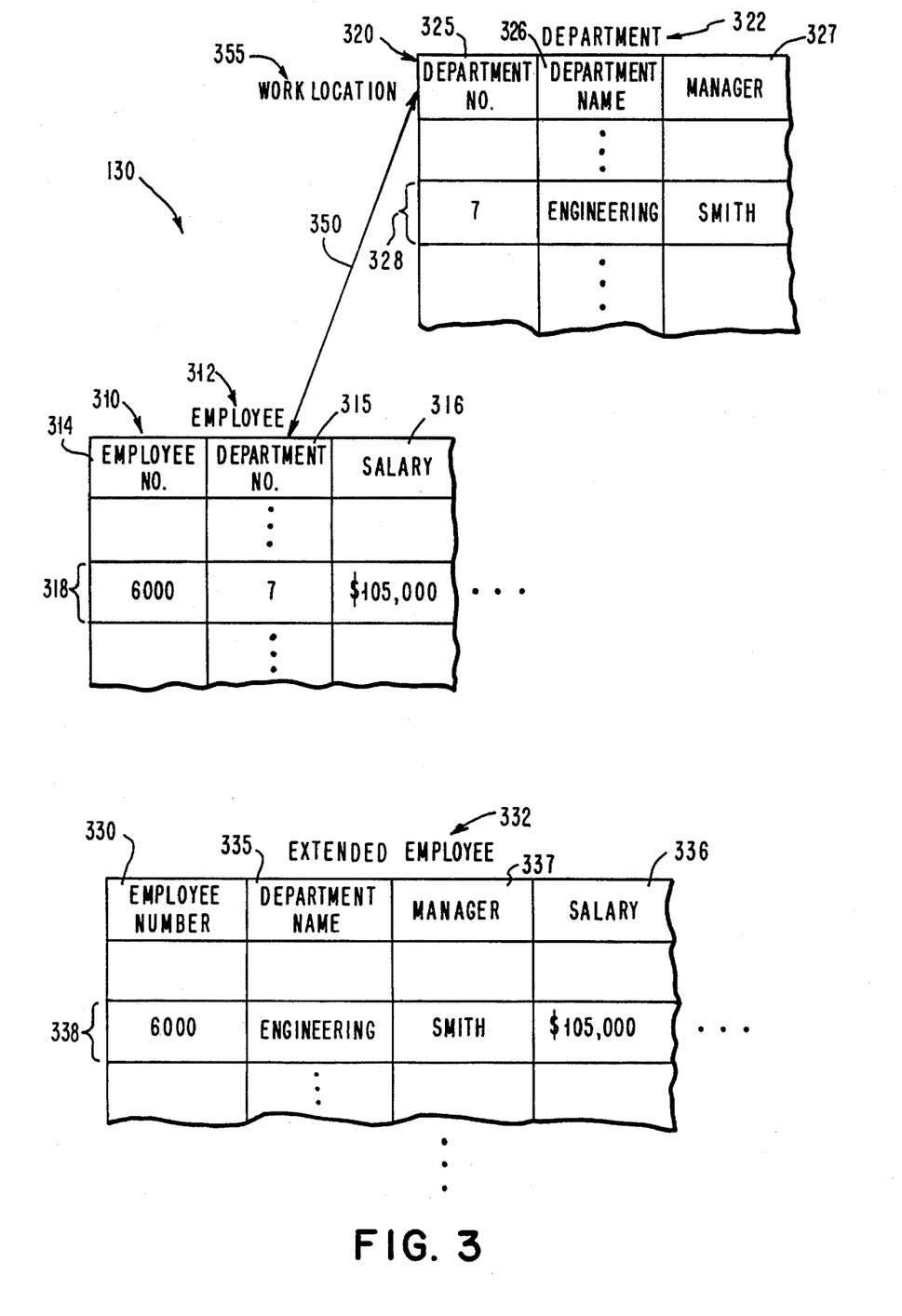
FIG. 3 shows one preferred database structure used to store information that is to be retrieved using the present invention.

For example, data about employees in a company is organized in a table 310. The table name 312 is "Employee". (Likewise, each given record 318 of the table 310 named "Employee" is named "Employee" or "Employee Record".) Each given record 318 of the table named "Employee" has one or more fields. Each of the plurality of fields also has a name. In the example, three field names (also called column names) are shown for the "Employee" table 310: Employee number 314, Employee department 315, Salary 316, etc.

Tables in a relational database may be related to one another. In the relational database case, there are two or more tables organized like the employee table 310. That is, each of the tables in the relational database has table (record) names and field (column) names for each field in a given record. For example, there can be an additional table 320 in the database with the name "Department" 322. The "Department" table also has records with one or more fields. Each of the fields also have names. In this example, the fields shown are: "Department number 325, "Department name" 326, "Manager" 327, etc. When a given field of two or more tables in a relational database represents the same type of information, there is a possible join between the two tables. In the case 350, this means that information can be accessed from the "Department" table through the "Employee" table by using the common field (here "Employee Department" 315) as a key. A subset of the possible joins are designated meaningful joins, such as 350, because they represent a useful relationship between the tables. Using meaningful joins to access information in relational database tables is well known. In the preferred embodiment, the meaningful joins 350 of the relational database 130 are also given names 355.

Using relational database techniques, other tables, called extended tables or views 330, can be created. The views are created using information from other related tables (310, 320) in the database 130. The newly created tables (views) also have a table (view) name 332 (here "Extended Employee") and fields with names (here "Employee Number" 334, "Department Name" 335, "Manager" 337, and "Salary" 336). Views (extended tables) can be created by the system designer or alternatively by the user (see box 280 of FIG. 2). The steps in defining a view are exactly the same as the steps in defining a query except that information is not used to access the database (as in query) but stored in the system for future use.

FIG. 3 also shows examples of the values that reside in fields of the database tables. A given record, 318, 328, and 338 in tables 312, 322, and 332, is shown to have the values: 6000 for the field named "Employee Number", Engineering for the field named "Department Name", Smith for the field name "Manager", and $105,000 for the field named "Salary", respectively.

Refer again to FIG. 2. In box 214, the elements of the results of the parse can be matched to database names in a number of ways that are known in the art. For example, one or more selected elements of the parser output or their synonyms can be matched against a list of names in the database i.e., for a relational database, the names of the tables, the names of the fields or columns, the names of the meaningful joins and the names of the views [1].

There are four possible results of the matching step in box 214:

1. None of the parser result elements match any database names.
2. Each of the parser result elements matches a single database name.
3. Some parser result elements (but not all) match database names.
4. Some or all of the parser result elements match more than one database name.

For the first result, the no match case 219, a message is given to the user 202 through the user interface 205 using a function like that in box 208. For the second set of parser results, the individually matched case, the matched parser result elements are converted into a database query in box 216. Results 3 and 4 are called match ambiguities 215 and will be discussed below.

When all of the parser result elements are successfully matched to names in the database, box 216 attempts to convert the parse tree and the matched elements into a database query. A database query is a formal specification used to retrieve data from a database. Thus, the output of box 216 is a set of field and record names in the database along with join specifications and some logical selection of the values of the fields in those records. For example, a simple, single table database query might take the form of: Select the "Department" (field name 315) from "Employee" (table/ record name 312) with "Salary" (field name 316) greater than "$100,000" (logical lower limit of the value in the "Salary" field.) This is well known prior art. See, for example, [3].

Sometimes the system fails to convert the successfully matched elements of the parser into a database query in box 216. For our purposes, this is called a query conversion ambiguity 217. A query conversion ambiguity 217 can occur in a number of ways. For example, if a single table and query name is matched an ambiguity occurs if there is no field in the selected table with a name that matches a field name selected by the database query. The handling of query conversion ambiguities 217 is described below.

In box 220, database queries, successfully converted from matched elements, are used to retrieve data from the database. The data is displayed (or provided) to the user 202 through the user interface 205. This is handled by a database management system using well known methods.

In the above discussion, specific preferred examples of the user 202, user interface 205, scanner/tokenizer 210, display feedback 208, parser 212, picking the "best parse" 225, displaying misunderstood parsed options 230, matching elements 214, converting to database queries 216, and retrieving and displaying database data 220 where presented. These aspects of the system have many alternative embodiments in the prior art that are envisioned within the scope of this invention. However, the prior art, as mentioned above, fails to resolve the many ambiguities (211, 213, 215, and 217) that may result in servicing a user input query, specifically the scanner/tokenizer ambiguity 211, the parser ambiguity 213, the matching ambiguity 215, and the query conversion ambiguity 217 that are identified above.

The present invention introduces a novel solution to resolving these ambiguities and furthermore is able to "learn" how to subsequently retrieve database information requested by input queries that initially produce ambiguities. These novel features are: selecting words/tokens or parser elements that the system 100 understands (create matched names list) 240, displaying the understood words/tokens or parser result elements to the user 250, and enabling the user to define new concepts so that ambiguities associated with the NL query do not arise in the future 280, i.e., the system learns.

Box 240 initially processes the scanning 211, parsing 213, match 215 and conversion 217 ambiguities 211.

In the event that some words/tokens of the input query are not recognized 211 (matched to entries in the dictionary) or the words/tokens of the input query cannot be parsed 213, the input query words/tokens themselves are matched to the names in the database. In the case of a match ambiguity 215, the parser result elements that matched database names and/or have multiple matches to database names in box 214 are passed to box 240. In the case of a conversion ambiguity 217, all the parser result elements are passed to box 240.

Box 240 uses matching techniques similar to those described in box 214. However, only those words/tokens or parser elements that match database names (i.e., table, field, meaningful join or view names) are "understood" by the system 100. Those matching database names pass as output from box 240. The other word/tokens or parser result elements, those not having a match to a database name, are ignored/discarded. Therefore, the output of box 240 is a list of database names that match the recognized components. (A component is a word/token or a parser result element.) In boxes 240 and 250, there may be one or more matches for each query component.

Box 250 resolves the ambiguities created in the scanner/tokenizer 210 (ambiguity 211), parser 212 (ambiguity 213), the matching elements 214 (ambiguity 215), and conversion 216 (ambiguity 217) steps, by presenting to the user 202 only the database names that match words/tokens or parse tree elements of an ambiguous query. Essentially, the system is presenting 250 to the user 202 what it understands of the input query. In the preferred embodiment, the system presents the user with what it understands by using a graphical display of a part of the database schema. See further description below.

In box 260, the user explores the schema. A schema, as described in detail below, is a graphical representation of the database tables and their relationships. In exploring the schema display, the user uses various well known features of graphical interfaces. For example, the user would click a mouse button when a mouse cursor is placed on a given window representing a table. This action would cause a menu to appear on the screen which would permit the user to access information about the selected table and/or its relationships. For example, the user could browse a list of field names of the table, browse all or selected records in the table, add tables that are related to the given table to the display, etc. See [4]. Other known exploration techniques are within the scope of this invention.

The output of box 260 is a new input query 265. This new input query 265 can be reentered to the system at the user interface 205. Since this new input query 265 was developed using names from the database, it is more likely to be processed by the system without ambiguities (211, 213, 215, and 217). That is, the scanner/tokenizer 210 will recognize all the words/tokens of the new input query 265, the parser will produce one parse, all parse result elements will be matched to database names 214, and the matched elements will be converted to a database query 216 that will be used to retrieve and display database information 220. This is likely but, by no means certain, as the user may make other changes in the query that may introduce ambiguities.

Alternatively, the user can use the partial schema display directly to create a database query 270. This is done by selecting one or more database tables from the schema display 250, then selecting one or more meaningful joins or specifying joins between the selected tables, selecting field names and specifying selection criteria on the field values. This is discussed in [5]. From box 270, the database query can be used to retrieve and display database information 220 directly without resubmitting a new input query 265 to the user interface 205 of the system.

The last function that the system provides is the ability to "learn" new concepts 280. Once the user 202 has defined a new concept as a database view, the system learns the concept by associating the new user defined concept 280 with a NL word or phrase. This learning process is described in more detail below.

Figure 4:
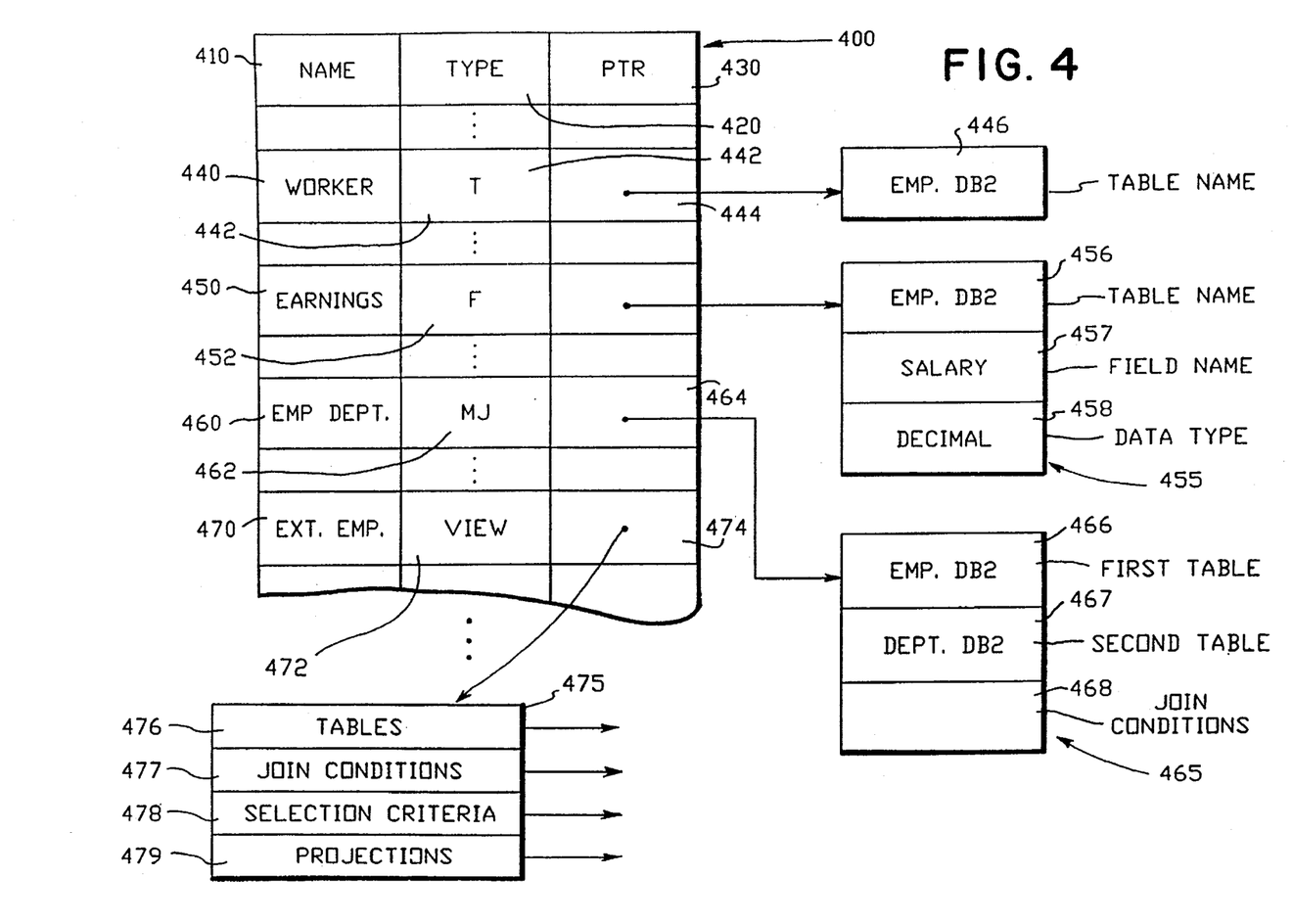
FIG. 4 shows a data structure of the present invention used to store the database names.

FIG. 4 shows a database names list structure 400. In the preferred embodiment, the list structure has a name field 410, a type field 420 and a pointer field 430. The name field contains names of the tables in the database (for example, 312, 322, and 332 in FIG. 3), the names of the fields of the tables (for example, 314 through 316, 325 through 327, and 334 through 337 in FIG. 3) along with names of meaningful joins (for example, 355 in FIG. 3) and names of views (for example, 332 in FIG. 3) that comprise the database 130.

Names may appear more than once in the name field 410 because a given name may appear as both a table and a field name, for example. Thus, in the process of matching an element of a parser output to a database name (240) we may get more than one match for a single element.

The type field 420 contains an indication of the type of the name, i.e. table name, field name, meaningful join name or view name.

A given pointer value 444 points to a record in memory 446 that contains information about the name that the pointer is associated with. For example, the information about a table name 440 is a record 446 containing the name of the table in the database. The information about a database field name e.g. 450 is a record 455 containing the name of the table it appears in, 456, the field name in the table, 457, and its datatype 458. The information about a name of a meaningful join 460 is a record 465 containing the name of the database tables it connects, 466 and 467, as well as the joining conditions 468. The information 474 about a database view name 470 is a structure 475 that contains pointers (476, 477, 478, 479) to other structures that contain the names of the tables for the view, the join information for the view, the selection constraints for the view and the columns from the component tables that are included in the view.

Alternate list structures are contemplated. For instance, the list might be optimized by reorganizing, e.g., placing the names in alphabetical order or in a hierarchical directory.

Figure 5:
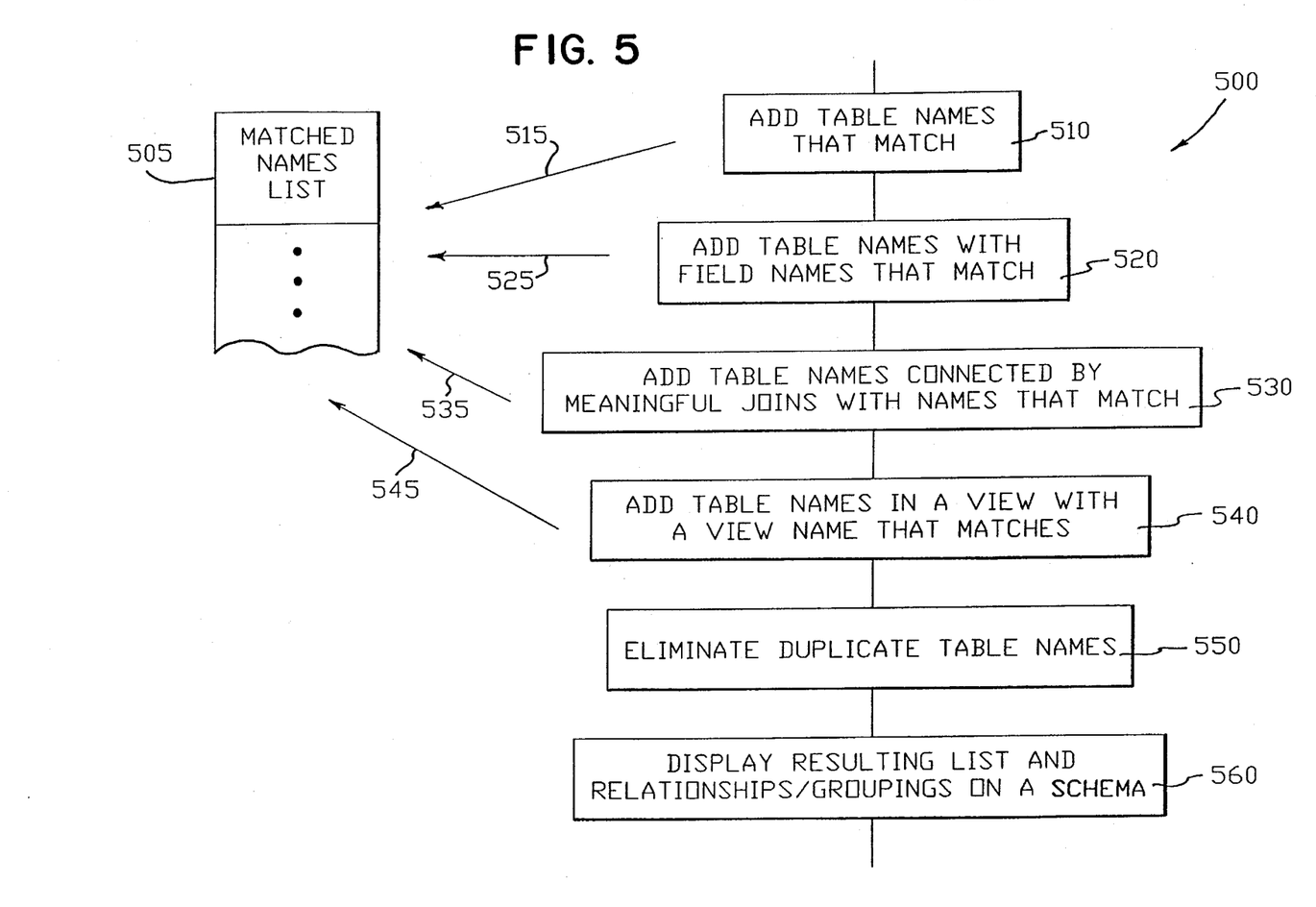
FIG. 5 is a flow chart showing how database names are matched to input query words/tokens or parser result elements to resolve ambiguous input queries.

FIG. 5 is a flowchart 500 showing the detailed steps used by the present invention to accomplish the functions of box 240 and 250 in FIG. 2.

In FIG. 2 the following is input to box 240: words/tokens from the scanner/tokenizer 210 (if there is a scanner ambiguity 211), or words/tokens from the parser 212 (if there is a parser ambiguity 213), or partially (or multiple matched) words/tokens if there is a match ambiguity 215, or all the parser result elements of the input query if there is a query conversion failure ambiguity 217. In box 240, the inputted components (words/tokens or parser result elements) are compared to the database names list 400 in boxes 510, 520, 530, and 540 of FIG. 5 to create a matched names list 505. In box 510, names of tables that match the components inputted to box 240 are added 515 to the matched names list 505. The names of tables that are added 515 in step 510 include table names like "Employee" 312 and "Department" 322 in FIG. 3. In box 520, the names of the tables having fields with names that match the box 240 input are added 525 to the matched names list 505. (For example, if "Department Number" is a token inputted to box 240, there is a match to fields 315 and 325 of table 310 and 320, respectively. In this case, the table names "Employee" 312 and "Department" 322 would be added to the matched names list 505.) In box 530, names of the meaningful joins (FIG. 3, 350) are compared to the input to box 240. The names of the tables that are connected by the matched meaningful joins are then added 535 to the matched names list 505. (For example, if "Work Location" 355 matches an input to box 240, the table names "Employee" 312 and "Department" 322 are added 535 to the matched names list 505 because that meaningful join 350 connects tables 310 and 320. In box 540, the names of each of a set of tables comprising a view is added 545 to the matched names list 505 if the name of the view matches any input to box 240. For example, since table 330, named "Extended Employee" 332 is a view made of the table 310 named "Employee" 312 and the table 320 named "Department" 322, both the name "Employee" 312 and "Department" 322 would be added to the matched names list 505 when the view name, "Extended Employee" 332 matches a word/token inputted to box 240.

In box 550, duplicate names in the matched names list 505 are eliminated. This can be done by known methods. In essence, this step takes a logical union of all matched names in the list.

In box 560, the names remaining on matched names list 505 are displayed, preferably as a schema diagram, along with their relationships. In the preferred embodiment, the tables that participate in a view are somehow designated, e.g., by grouping, color, or highlighting. (See box 250 of FIG. 2.) Note that the system is displaying to the user 202 only the names of the database elements that match/correspond to some of the components (words/tokens or parser result elements) of the user input query, i.e., the system displays what it understands of the query.

Figure 6:
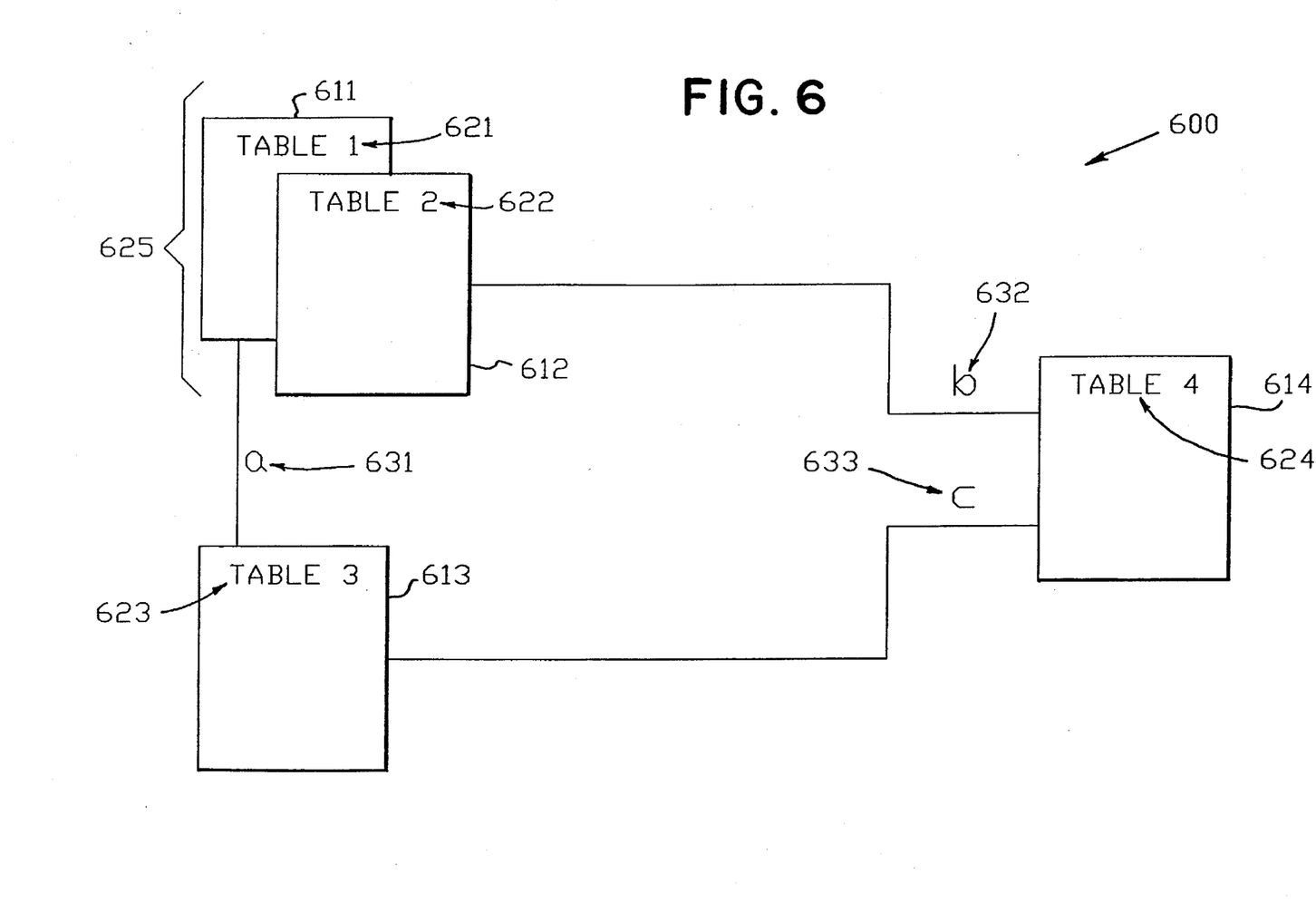
FIG. 6 is an example of a preferred schema display showing the user only what the system understands of an ambiguous query.

FIG. 6 shows an example of one preferred embodiment of a schema. (Also see box 250 in FIG. 2.) In the preferred embodiment, a representation (e.g., a window) is displayed on the interface 105 for each table that has a name remaining on the matched names list 505 after step 550 in FIG. 5. The representations are placed on the interface using known display technology. The table representations are named, organized, and related to one another using information described in FIG. 4.

The example 600 in FIG. 5 shows four windows (611 through 614) each representing a table named on the matched names list 505. The designations Table 1 through Table 4 (621 through 624) are the names of the tables. Tables 1 and 2 are group together as a set 625 on the display because they are the two tables comprising a view or extended table 625. The tables are related to one another by meaningful joins 631 through 633 with names "a", "b", and "c" respectively. To further illustrate, Table 1 might be the name of the table "Employee" (312 in FIG. 3) and Table 2 might be the name of the table "Department" (322 in FIG. 3) that are grouped together because they are part of the view 625 named "Extended Employee" (322 in FIG. 3). Meaningful joins, like the one named "Work Location" 355 (350 in FIG. 3), connect the tables 600 together. The meaningful join named "a" connects tables 1 and 3, as the meaningful join named "b" connects tables 2 and 4, and further as the meaningful join named "c" connects tables 3 and 4. Known ways of exploring the schema are used, as described above, to allow the user 202 to create new queries (265 or 270) or define a concept 280.

Information used by the graphical interface 105 to create the schema 600 is obtained from the database names list 400. In the preferred embodiment, the names of the tables in the schema display come from fields 446, 456, 466, 467, and 476. Tables can be grouped according to the views or extended tables in which they participate. this information is also included in the database names list 400 in fields 470 and 476. This information is provided to the graphical interface 105 for the tables listed in the matched names list by known algorithms.

Figure 7:
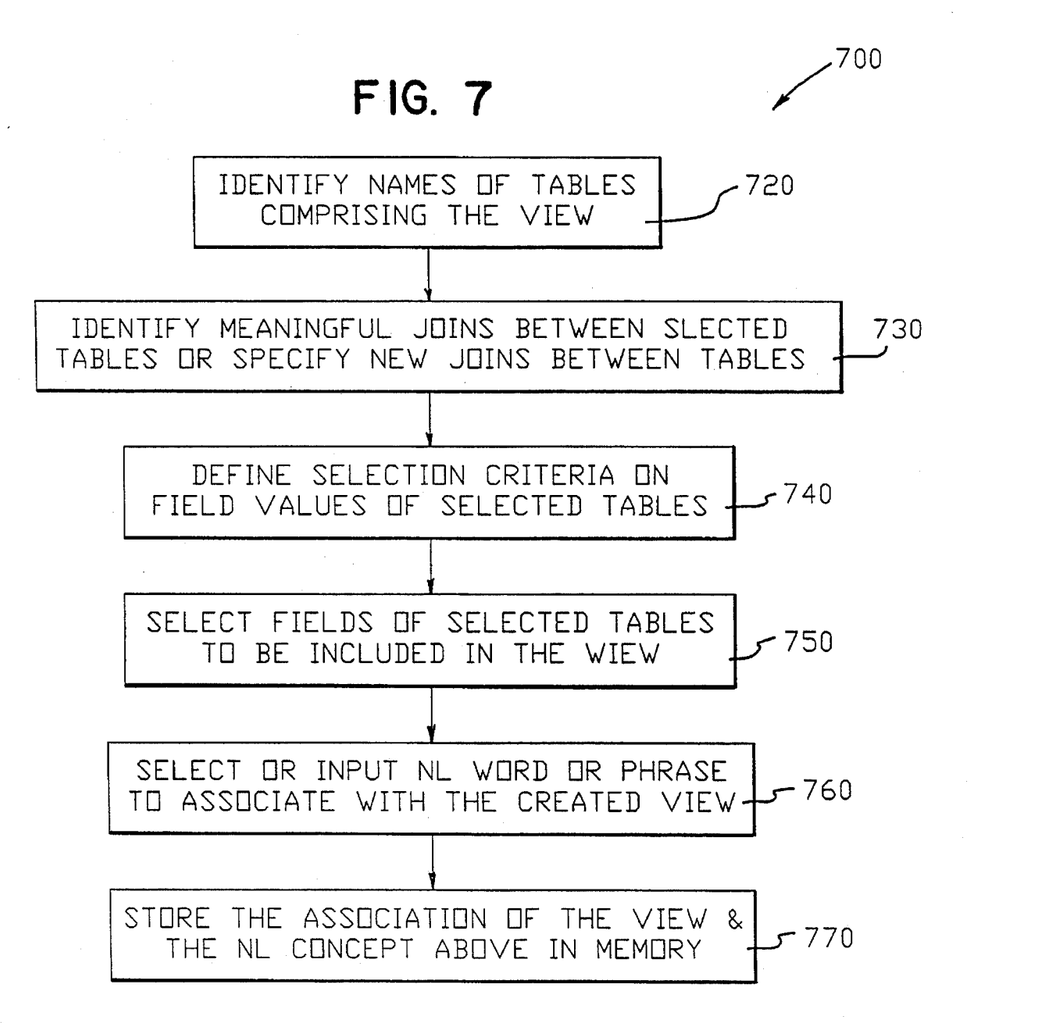
FIG. 7 is a flow chart showing how the present invention learns to subsequently respond to an ambiguous NL query by associating a NL word or phrase with a selected set of information within the database.

FIG. 7 is a flowchart showing how the system learns concepts. In particular, the method 700 matches concepts of a human user 202 to the way that information is stored in the system 100 database 130. In the preferred embodiment, the human user 202 uses the interface 205 to explore the schema as described in the explanation of box 260. The steps in creating the view are identical to the steps in creating a database query (box 270 in FIG. 2). The steps in creating a view are further defined in boxes 720, 730, 740 and 750. In box 720, the user identifies the names of the tables that comprise the view. In box 730, the user identifies the names of the meaningful joins that are needed to connect specific tables comprising the view. The user may also define other joins between the selected tables. In box 740 the user specifies selection criteria on field values as required. In box 750, the user identifies and selects the names of the fields in the tables that are to be included in the view.

Once the view is defined, the user selects or inputs a NL word or phrase 760 that is to be associated with the newly created view 750. This may or may not be part of the original NL query. When the user has provided the system 100 with all the above information defining the new association, the information is stored in memory 770. This is done by creating a new view name in the database names list 400 to be used in future matching operations.

We claim:

1. A database retrieval system means having a user interface means for receiving one or more queries from a user and providing the user with database information, a tokenizer means for separating the query into system recognizable tokens, a parser means for parsing the tokens into parser result elements, a matching means for matching the parser result elements to a list of database names, a query means for converting the matched database names into a database query, and a retrieving means for retrieving results of the database query and presenting the results on the user interface, the system comprising:

- a matched names list creating means for identifying components of an ambiguous query that are understood by the system by matching one or more query components to the list of database names and retaining on the matched names list the database names of tables that correspond to the components that match one or more database names on the list; and

- an interface presentation means for presenting to the user one or more database table names associated with the matched components, the matched components being those that the system understands, and one or more relationships among the table names, through the interface means so that the user can use the table names and their relationships to access more database information.

2. A system, as in claim 1, where the database table names correspond to the understood components because the table names match the understood components.

3. A system, as in claim 1, where the database table names correspond to the understood components because the understood components match one or more meaningful join names that names a meaningful join that relates the corresponding table names.

4. A system, as in claim 1, where the database table names correspond to the understood components because the understood components match a view name that names a view that includes the corresponding named tables.

5. A database retrieval system having a user interface for receiving one or more queries from a user and providing the user with database information, a tokenizer for separating the query into system recognizable tokens, a parser for parsing the tokens into parser result elements, a means for matching the parser result elements to a list of database names, a means for converting the matched database names into a database query, and a means for retrieving results of the database query and presenting the results on the user interface, the system comprising:

- a matched names list creator for identifying one or more components of an ambiguous query that are understood by the system, the matched name list being created by matching the query components to the list of database names and listing the database names associated with the matched components, the matched components being those the system understands; and

- an interface presentation that presents to the user the database names in the matched names list and one or more relationships between names on the matched list and other database names through the user interface so that the user can use the listed names and their relationships to access more database information.

6. A system, as in claim 5, where the presentation is a schema display on a graphical user interface.

7. A system, as in claim 6, where the query is a natural language query.

8. A system, as in claim 7, where an ambiguous query is caused by a tokenizer ambiguity because one or more of the query token words is not recognized by the tokenizer and one or more query token words is recognized by the tokenizer, the recognized query token words being the components matched to database names to create the matched names list and the interface presentation being presented to the user to access information to resolve the ambiguity.

9. A system, as in claim 7, where an ambiguous query is caused by a parser ambiguity because no parse is produced by the parser and the components are query tokens that are matched to the database names to create the matched names list and the interface presentation is presented to the user to access information to resolve the ambiguity.

10. A system, as in claim 7, where an ambiguous query is caused by a match ambiguity because one or more parser result elements do not match the database names and the components are one or more parser result elements that do match the database names, the components being matched to the database names to create the matched names list and the interface presentation being presented to the user to access information to resolve the ambiguity.

11. A system, as in claim 7, where an ambiguous query is caused by a match ambiguity because one or more parser result elements each match more than one the database names and the components being the parser result elements, the components being matched to the database names to create the matched names list and the interface presentation being presented to the user to access information to resolve the ambiguity.

12. A system, as in claim 7, where an ambiguous query is caused by a failed query conversion to a database query, the components being all the parser result elements each matching a single database name, the components being matched to the database names to create the matched names list and the interface presentation being presented to the user to access information to resolve the ambiguity.

13. A system, as in claim 7, where the names on the list of database names are names of one or more tables, names of one or more fields in tables, names of one or more meaningful joins, and names of one or more views that reside in the database.

14. A database retrieval system having a user interface for receiving a query from a user and providing the user with database information, a tokenizer for separating the query into system recognizable tokens, a parser for parsing the tokens into parser result elements, a means for matching the parser result elements to a list of database names, a means for converting the matched database names into a database query, and a means for retrieving results of the database query and presenting the results on the user interface, the system comprising:

- a matched names list creator for identifying components of an ambiguous query that are understood by the system by matching the query components to the list of database names and listing the database names associated with the matched components, the matched components being those the system understands;

- an interface presentation that presents the database names on the matched names list to the user through the user interface along with one or more relationships of matched names with other database names so that the user can use the presentation to access additional database information;

- a means for defining a database view that is designed by the user from information accessed from the database; and

- a means for associating the database view with natural language words or phrases so that the database view will be matched when the interface again receives a similar query; wherein said natural language words or phrases are components of the ambiguous query.

* * * * *